(12) United States Patent
Laemmle et al.

(10) Patent No.: US 11,548,400 B2
(45) Date of Patent: Jan. 10, 2023

(54) INDUCTION CHARGING DEVICE FOR A VEHICLE CHARGING SYSTEM

(71) Applicant: Mahle International GmbH, Stuttgart (DE)

(72) Inventors: Christopher Laemmle, Stuttgart (DE); Timo Laemmle, Kernen (DE); Holger Schroth, Maulbronn (DE)

(73) Assignee: Mahle International GmbH

( * ) Notice: Subject to any disclaimer, the term of this patent is extended or adjusted under 35 U.S.C. 154(b) by 29 days.

(21) Appl. No.: 17/088,538

(22) Filed: Nov. 3, 2020

(65) Prior Publication Data

US 2021/0129694 A1     May 6, 2021

(30) Foreign Application Priority Data

Nov. 4, 2019    (DE) ........................ 102019216971.6

(51) Int. Cl.
     *B60L 53/302*     (2019.01)
     *H02J 50/10*     (2016.01)
     (Continued)

(52) U.S. Cl.
     CPC ............. *B60L 53/302* (2019.02); *B60L 53/12* (2019.02); *H02J 7/02* (2013.01); *H02J 50/005* (2020.01); *H02J 50/10* (2016.02); *B60L 53/60* (2019.02)

(58) Field of Classification Search
     CPC ........ B60L 53/302; B60L 53/12; B60L 53/60; H02J 7/02; H02J 50/005; H02J 50/10;
     (Continued)

(56) References Cited

U.S. PATENT DOCUMENTS

| 6,777,835 B1 | 8/2004 | Sines |
| 9,550,427 B2 | 1/2017 | Takeshita et al. |

(Continued)

FOREIGN PATENT DOCUMENTS

| CN | 103119669 A | 5/2013 |
| CN | 204204611 U | 3/2015 |

(Continued)

OTHER PUBLICATIONS

English abstract for DE-102013217728.

(Continued)

*Primary Examiner* — Paul Dinh
(74) *Attorney, Agent, or Firm* — Fishman Stewart PLLC

(57) ABSTRACT

An induction charging device for a vehicle charging system may include a housing, a cooling device, a magnetic field conductor unit, at least one induction coil, and at least one heat conductance device. The magnetic field conductor unit may be configured to direct a magnetic field. The at least one induction coil may be configured to wirelessly transfer energy with a predetermined transmission power. The at least one heat conductance device may be arranged, with respect to an axial axis, between at least two components. The at least one heat conductance device may have an axial thermal conductivity with respect to the axial axis. The axial thermal conductivity of the at least one heat conductance device may vary at least partially with respect to at least one lateral axis that is aligned at least one of substantially perpendicularly and substantially transversely to the axial axis.

20 Claims, 5 Drawing Sheets

(51) Int. Cl.
  *H02J 50/00* (2016.01)
  *B60L 53/12* (2019.01)
  *H02J 7/02* (2016.01)
  *B60L 53/60* (2019.01)

(58) Field of Classification Search
  CPC .. H02J 2310/48; Y02T 10/70; Y02T 10/7072; Y02T 90/12; Y02T 90/14
  USPC ......................................................... 320/108
  See application file for complete search history.

(56) References Cited

U.S. PATENT DOCUMENTS

| | | | |
|---|---|---|---|
| 10,227,015 B2 | 3/2019 | Kume et al. | |
| 10,304,617 B2 | 5/2019 | Maikawa | |
| 10,596,910 B2 | 3/2020 | Nakahara et al. | |
| 10,756,572 B2 | 8/2020 | Ansari et al. | |
| 2012/0119698 A1* | 5/2012 | Karalis | H02J 50/12 320/108 |
| 2013/0119925 A1* | 5/2013 | Kawamura | H02J 50/10 320/108 |
| 2013/0181797 A1 | 7/2013 | Hickox | |
| 2016/0233723 A1 | 8/2016 | Lestoquoy et al. | |
| 2018/0254136 A1 | 9/2018 | Ueda et al. | |
| 2019/0221353 A1 | 7/2019 | Hwang | |

FOREIGN PATENT DOCUMENTS

| | | |
|---|---|---|
| CN | 107408453 A | 11/2017 |
| CN | 107539140 A | 1/2018 |
| CN | 107924752 A | 4/2018 |
| CN | 109155183 A | 1/2019 |
| DE | 695 08 133 T2 | 7/1999 |
| DE | 10 2010 044 999 A1 | 3/2012 |
| DE | 10 2013 217 728 A1 | 3/2015 |
| DE | 10 2017 200 465 A1 | 11/2017 |
| EP | 3467855 A2 | 4/2019 |
| WO | 2011112795 A1 | 9/2011 |
| WO | WO-2016/030413 A1 | 3/2016 |

OTHER PUBLICATIONS

English abstract for DE-10 2010 044 999.
English abstract for DE-695 08 133.
Chinese Search Report dated Mar. 15, 2022 for copending Chinese App. No. CN202011202158.9 (with English translation).
Chinese Office Action dated Mar. 24, 2022 for copending Chinese App. No. CN202011202158.9 (with English translation).
Laird, "Ceramic Plate Series CP2-127-06: Thermoelectric Modules", 2016.

* cited by examiner

INDUCTION CHARGING DEVICE FOR A VEHICLE CHARGING SYSTEM

CROSS-REFERENCE TO RELATED APPLICATIONS

This application claims priority to German Patent Application No. DE 10 2019 216 971.6, filed on Nov. 4, 2019, the contents of which is hereby incorporated by reference in its entirety.

TECHNICAL FIELD

The present invention relates to an induction charging device for a vehicle charging system, and such a vehicle charging system. The invention further relates to a stationary induction charging station and a vehicle for such a vehicle charging system.

BACKGROUND

In order to increase the acceptance of electrically driven vehicles with end users, it can be advantageous if the energy transfer between a stationary energy source and a traction battery unit of the vehicle takes place in a contactless or respectively wireless manner. A wireless energy transfer is advantageous for end users, because for example no charging cables have to be carried or respectively inserted. In addition, stationary induction charging stations can be partly buried in the ground area, so that a better integration into a townscape or landscape is possible.

During a charging operation of an induction charging device of a vehicle charging system, power losses occur through electronic switching processes and/or through an effect of chronologically varying electromagnetic fields, which power losses thermally stress the components within the induction charging device. The resulting heat should therefore be dissipated, in order to prevent a damage to the components within the induction charging device through a thermal overload.

DE 10 2013 217 728 A1 relates to a coil arrangement, in particular for a charging device for the wireless energy-related coupling of an energy source, with a coil having a connecting area, wherein the coil has a winding having several turns, and a ferromagnetic body, which is at least partially embraced by the winding, wherein at least one region of the turn provides the connecting area, characterized by a heat-conducting element, thermally coupled to the ferromagnetic body, which heat-conducting element terminates substantially flush with the connecting area.

US 2016/0233723 A1 relates to wireless current devices for the receiving of current from a wireless current source. The devices contain a first plurality of magnetic material pieces of substantially planar form, which are arranged in a first plane, wherein the first plurality of magnetic material pieces has a first planar surface and a second planar surface.

DE 10 2010 044 999 A1 relates to an arrangement for charging a vehicle battery of a vehicle, with a secondary induction device, which is configured and/or arranged in such a way that a primary induction device, which is fed from an energy source outside the vehicle and generates an electromagnetic alternating field, can induce in the secondary induction device an alternating current which supplies charging device for charging the vehicle battery with energy, characterized in that at least one heat transport means is provided, with the aid of which thermal energy which arises through power loss in the secondary induction device and/or in the charging device is at least partially usable for heating the vehicle battery, a vehicle interior and/or a component of an air-conditioning system of the vehicle.

WO 2016/030413 A1 relates to a receiving device for receiving a magnetic field and for generating electrical energy through magnetic induction, in particular for use in a vehicle. Here, a first cooling structure is arranged between a first field-forming arrangement, which comprises magnetizable material, which is adapted in order to form magnetic field lines of the magnetic field, and a capacitor arrangement. Here, the first cooling structure can be used in order to cool both the first field-forming arrangement and also the capacitor arrangement. In particular, the first cooling structure is in direct mechanical contact with both arrangements, so that an efficient heat transfer takes place to the first cooling structure.

DE 10 2017 200 465 A1 relates to a charging contact point for an electric vehicle, comprises a cooling means arrangement, a magnet arrangement and an electronics arrangement. The electronics arrangement further comprises a thermal interface material layer. The thermal interface material layer is arranged between the PCB and the control board and the upper wall of the cooling means arrangement.

DE 695 08 133 T2 relates to battery charging equipment and in particular an inductive charging port of a high-power inductive battery charging device, wherein heat exchangers, directing cooling medium, can be connected with respective inner turns of the sets of secondary windings, wherein for example a conducting adhesive or epoxy resin is used.

DE 10 2013 217 728 A1 and US 2016/0233723 A1 have no cooling device within the coil arrangement or respectively current device. DE 10 2010 044 999 A1 does in fact have a cooling device which, however, is arranged outside the induction device. A disadvantage here is that a heat dissipation must take place via the housing sections of the devices which have a high thermal resistance or at least form an additional thermal resistance.

WO 2016/030413 A1 comprises a first cooling structure which is in direct mechanical contact with both arrangements of the receiving device. Such a direct mechanical contact is disadvantageous at least in that between the first cooling structure and the two arrangements of the receiving device, undesired air cushions form due to the surface quality, which increase the thermal resistance. Compared thereto, in DE 10 2017 200 465 A1 a thermal interface material layer is arranged between the PCB and the control board and the upper wall of the cooling means arrangement. In DE 695 08 133 T2 a heat exchanger, directing cooling medium, is connected with inner turns of the sets of secondary windings for example by means of a conducting adhesive or epoxy resin. Through an adhesive or epoxy resin, undesired air cushions can indeed be prevented, however through the use of an adhesive the overall weight and the production costs are increased.

SUMMARY

The present invention is based on the problem of indicating an improved or at least an alternative embodiment of an induction charging device and/or a vehicle charging system and/or a stationary induction charging station for such a vehicle charging system and/or a vehicle for such a vehicle charging system, wherein in particular a reduction of the overall weight and/or of the production costs and/or of the thermal load, in particular thermal gradients in components, is provided.

This problem is solved according to the invention by the subject matter of the independent claim(s). Advantageous embodiments are the subject matter of the dependent claim(s).

The present invention is based on the general idea that the axial thermal conductivity of at least one heat conductance device varies at least partially with respect to the axial axis along at least one lateral axis aligned substantially perpendicularly and/or transversely to the axial axis.

The induction charging device for a vehicle charging system comprises a housing which forms a housing interior. The housing can be formed having multiple pieces and/or multiple parts, in particular having two pieces and or two parts. The housing can form a base section and a cover section separate therefrom, wherein the base section and the cover section can form a housing interior. The housing interior can be formed in a fluidically sealed manner with respect to an environment of the induction charging device.

The housing, which forms a housing interior, can be formed having one piece and/or one part. The one-piece and/or one-part housing can be formed by a casting compound, in particular by a hardened casting compound. The housing interior of the one-piece and/or one-part housing can be filled at least partially or completely with casting compound. The housing interior can be formed in a fluidically sealed manner with respect to an environment of the induction charging device.

The induction charging device comprises a cooling device, arranged in the housing interior, for cooling the induction charging device. The cooling device can be arranged entirely or at least partially in the housing interior. The cooling device can be arranged partially in the housing interior and partially between the base section and the cover section so that the housing interior is divided by the cooling device into a first partial housing interior and a second partial housing interior. Here, the base section and the cover section can be arranged spaced apart from one another and/or can be arranged on opposite surface sides of the cooling device. Here, the cover section and the cooling device can form the first partial housing interior, wherein the base section and the cooling device can form the second partial housing interior.

The cooling device can be configured as a cooling body which is able to be flowed through by fluid, in particular able to be fluid through by gas and/or able to be flowed through by liquid.

The cooling body which is able to be flowed through by fluid, in particular able to be flowed through by gas and/or able to be flowed through by liquid, can be a cooling plate which is able to be flowed through by fluid, in particular able to be flowed through by gas and/or able to be flowed through by liquid. Such a cooling plate can have a parallelepiped-shaped and/or plate-shaped configuration. Such a cooling plate can have two substantially planar and/or flat main cooling surfaces, which are spaced apart from one another with respect to an axial axis and which are aligned substantially parallel to one another. The planar and/or flat main cooling surfaces can be aligned substantially perpendicularly and/or orthogonally to the axial axis.

The cooling body, in particular the cooling plate, can have a fluid inlet and a fluid outlet spaced apart with respect thereto, which are fluidically connected with one another through a fluid channel system and/or a fluid channel of the cooling body, in particular of the cooling plate. For this, the cooling body, in particular the cooling plate, can be penetrated by the fluid channel system and/or a fluid channel so that the fluid channel system and/or the fluid channel are only able to be fluidically connected via the fluid inlet and/or the fluid outlet with an exterior environment of the cooling body, in particular of the cooling plate.

The cooling device, in particular the cooling body and/or the cooling plate, can be fluidically connected with a fluid circuit, in particular via the fluid inlet and/or the fluid outlet. The housing can have apertures, in particular sealed apertures, through which sections of the fluid circuit, in particular fluid duct sections, and/or the fluid inlet and/or the fluid outlet can be partially inserted.

The fluid circuit can have a fluid conveying device, in particular a liquid conveying device, which conveys a fluid, in particular a gas and/or a liquid, through the fluid circuit, wherein the fluid, on flowing through the cooling device, in particular the cooling body and/or the cooling plate, receives and transports away waste heat from the induction charging device. Provision can be made that the fluid is a liquid, in particular provision can be made that the liquid can comprise water, a coolant, a refrigerant and/or oil.

The fluid can be encapsulated in the fluid circuit with respect to an environment of the fluid circuit. The fluid in the fluid circuit can be fluidically separated from an environment of the fluid circuit. The fluid circuit can comprise fluid ducts. The fluid circuit can be formed as a closed fluid circuit, in particular as a closed cooling circuit. The fluid, in particular a liquid coolant, can form a circulating medium which can circulate in a closed fluid circuit, in particular in a closed cooling circuit, within the components of the circuit. In other words, provision can be made that during the operation of the fluid circuit, in particular during the operation of the cooling circuit, a fluid, in particular a liquid coolant, is neither introduced from the exterior (environment) nor is delivered to the exterior.

The cooling device, in particular the cooling body and/or the cooling plate, can be formed from an electrically conducting material, in particular from a metallic material. The cooling device, in particular the cooling body and/or the cooling plate, can be integrated into a shield plate. Here, a shield plate can be arranged circumferentially around the cooling device, in particular the cooling body and/or the cooling plate. The shield plate can be formed from an electrically conducting material. The shield plate can have an aperture opening which completely penetrates the shield plate. In this aperture opening the cooling device, in particular the cooling body and/or the cooling plate, can be arranged, in particular arranged in a precisely fitting manner. The shield plate can be arranged outside the housing.

The induction charging device comprises a magnetic field conductor unit, arranged in the housing interior, for magnetic field directing. The magnetic field conductor unit can be arranged in the second partial housing interior. The magnetic field conductor unit can be formed for the directing of magnetic fields in order to provide a reduction of transmission losses in wireless energy transmission.

The magnetic field conductor unit can be formed by one or more magnetic field conductors. The magnetic field conductor unit can be formed by several magnetic field conductors spaced apart from one another, which in particular can be arranged substantially in a common plane.

A magnetic field conductor has a higher magnetic permeability compared to air and can be formed at least partially from ferrimagnetic and/or ferromagnetic and/or soft magnetic materials. The magnetic field conductor can be configured as a plate element and/or as a sintered plate element.

The induction charging device comprises at least one induction coil arranged in the housing interior for wireless energy transmission with a predetermined transmission power. The induction coil can be arranged in the second partial housing interior. The induction coil can be formed by a litz wire, in particular by a high-frequency litz wire.

The induction coil can be formed as a flat coil or spiral flat coil or rectangular flat coil or as a double-D coil. The induction coil can be formed as a flat coil or spiral flat coil or rectangular flat coil or as a double-D coil, wherein the winding of the induction coil can be formed in one or several planes, in particular with respect to Z-axis or respectively with respect to the axial axis. These several planes can be arranged spaced apart from one another with respect to a Z-axis or respectively with respect to the axial axis. A winding of the induction coil in several planes can be formed in particular in a stationary induction charging station.

The induction coil can be formed as a primary coil which generates a chronologically varying magnetic field, in order to enable a wireless energy transmission with the predetermined transmission power. For this, the primary coil can be supplied with the necessary electrical energy via a stationary energy source. The induction coil can be formed as a secondary coil, in which an electrical alternating voltage and/or an electrical alternating current is induced, if the secondary coil is situated in the effective range of a chronologically varying magnetic field of a primary coil.

Provision can be made that the predetermined transmission power has a maximum transmission power of at least 10 kW, 11 kW or more. A maximum transmission power of at least 10 kW, 11 kW or more can be advantageous in particular for the charging of a traction battery unit of a vehicle, in order to minimize the necessary charging time. A throttled area can be formed in which a wireless energy transmission can be formed with a throttled transmission power compared to the maximum transmission power. Such a throttled transmission power can be 500 W for example.

The induction coil can be wound substantially around an axial axis. The induction coil can be wound substantially around the axial axis along a winding path. Here, the induction coil can form several windings, in particular several windings spaced apart from one another.

The induction charging device comprises at least one heat conductance device, arranged in the housing interior, for the transport of heat between at least two components of the induction charging device arranged within the housing interior. The components arranged within the housing interior can be, for example, the cooling device and/or the magnetic field conductor unit and/or the induction coil and/or a power electronics unit.

The at least one heat conductance device is arranged with respect to an axial axis between at least two components of the induction charging device arranged within the housing interior, wherein the at least one heat conductance device has an axial thermal conductivity with respect to the axial axis, wherein the axial thermal conductivity of the at least one thermal conduction device varies at least partially with respect to at least one lateral axis aligned substantially perpendicularly and/or transversely to the axial axis. In other words, the value of the axial thermal conductivity can form and/or have a variation depending on a position with respect to at least one lateral axis.

The thermal conductivity $\lambda$, in particular the coefficient of thermal conductivity can be defined by $$\lambda = \frac{\dot{Q} \cdot l}{A \cdot \Delta T}$$

wherein $\dot{Q}$ is a heat flow, wherein l is a wall thickness of a wall, wherein A is an area of the wall and wherein $\Delta T$ is a temperature difference. In the case of the axial thermal conductivity with respect to the axial axis, the wall thickness l can correspond to the heat conductance device extent with respect to the axial axis.

The thermal resistance can be inversely proportional to the thermal conductivity. A reciprocal proportionality can exist between the thermal conductivity and the thermal resistance.

In other words, the thermal resistance of the at least one heat conductance device can vary at least partially with respect to the axial axis along at least one lateral axis aligned substantially perpendicularly and/or transversely to the axial axis.

The thermal resistance can be the specific thermal resistance (specific heat resistance).

The at least one lateral axis can be aligned perpendicularly and/or transversely and/or orthogonally to the axial axis. A lateral plane can be spanned through two lateral axes, wherein the two lateral axes are aligned perpendicularly and/or transversely and/or orthogonally to one another, wherein the two lateral axis are respectively aligned perpendicularly to the axial axis.

The heat conductance device can therefore have an axial thermal conductivity with respect to the axial axis, wherein this axial thermal conductivity forms at least partially a variation with respect to a lateral axis and/or depending on the position with respect to the lateral plane. This can also be understood to mean that the local or respectively location-dependent thermal resistance of the heat conductance device varies.

The heat conductance device can have a defined extent in the lateral plane. The axial thermal conductivity of the heat conductance device can vary over the entire lateral extent of the heat conductance device, in particular can vary partially or continuously. The heat conductance device can have a defined extent with respect to the axial axis, which can be substantially constant along at least one lateral axis.

The heat conductance device can be formed having one piece and/or one part. Here, the heat conductance device can be formed for example as a heat conducting foil. The heat-conducting foil can be formed from a base material into which partially heat-conducting material is introduced, in order to form heat-conducting regions and thermal insulating regions. Here, the heat conductance device can form several heat-conducting regions and several thermal insulating regions. The thermal insulating regions can be formed exclusively by thermally insulating base material. The several heat-conducting regions can be arranged spaced apart from one another with respect to at least one lateral axis, wherein between the heat-conducting regions respectively an insulating region is arranged. The several heat-conducting regions can have different distances with respect to at least one lateral axis. The several heat-conducting regions can have substantially equidistant distances with respect to at least one lateral axis.

The spaced-apart heat-conducting regions can have substantially identical axial thermal conductivities. The spaced-apart heat-conducting regions can have different axial thermal conductivity.

The heat conductance device can be formed having several pieces and/or several parts. Here, the heat conductance device can be formed by several separate heat-conducting elements, which can be arranged spaced apart from one another by thermal insulating regions with respect to at least one lateral axis. The thermal insulating regions can be formed as air regions. The air regions can be filled exclusively by air. Here, the heat conductance device can form several heat-conducting elements and several thermal insulating regions. The several heat-conducting elements can be arranged spaced apart from one another with respect to at least one lateral axis, wherein between the heat-conducting elements an insulating region is respectively arranged. The several heat-conducting elements can have different distances with respect to at least one lateral axis. The several heat-conducting elements can have substantially equidistant distances with respect to at least one lateral axis.

The spaced-apart heat-conducting elements can have substantially identical axial thermal conductivities. The spaced-apart heat-conducting elements can have different axial thermal conductivities.

The heat-conducting elements can form a thermally conductive interface which is applied in a targeted and/or partial manner. The heat-conducting elements can be connected at least partially in a materially bonded manner with at least one component of the induction charging device arranged within the housing interior. The heat-conducting elements can be formed e.g. as a gap pad, in particular as a self-adhesive gap pad, and/or as adhesive and/or as ceramic and/or as a substrate containing ceramic and/or a coating. The application of the heat-conducting elements can take place by means of a particularly suitable process with regard to the thermal transition (e.g. sintering, soldering, bonding, welding). Hereby, an expensive casting, in terms of weight and cost, with heat-conducting casting compound can be avoided.

Heat-conducting regions and/or heat-conducting elements can have a thermal conductivity of at least 0.5 W/m·K, is particular of at least 1 W/m·K, in particular of at least 10 W/m·K. Thermal insulating regions can have a thermal conductivity of less than 0.5 W/m·K, in particular of less than 0.2 W/m·K. Thermal insulating regions can have a thermal conductivity of air.

The heat-conducting regions and/or heat-conducting elements can form a thermal resistance and/or a thermal transmission resistance of less than 200 mm$^2$·K/W. The heat-conducting elements can form a thermal resistance and/or a thermal transmission resistance of less than 20 mm$^2$·K/W. The thermal transmission resistance can be determined from the quotient of the layer thickness of the heat-conducting region or respectively of the heat-conducting element with respect to the axial axis and the thermal conductivity. The layer thickness with respect to the axial axis can be less than or equal to 1 mm, in particular less than or equal to 100 □m. The layer thickness with respect to the axial axis can lie for example in the range of 10 □m to 100 □m, in particular in the range of 20 □m to 80□□m, in particular in the range of 40 □m to 60 □m. The layer thickness with respect to the axial axis can be 50 □m, for example. Here, the heat-conducting elements can be formed as ceramic-based materially bonded connections (e.g. silver sintering). In particularly complex, ceramic-based materially bonded connections (e.g. silver sintering), values <20 mm$^2$·K/W can be reached.

The housing can be formed separately with respect to the cooling device and/or the magnetic field conductor unit and/or the heat conductance device and/or the induction coil and/or a power electronics unit.

The cooling device can be formed separately with respect to the magnetic field conductor unit and/or the heat conductance device and/or the induction coil and/or a power electronics unit.

The magnetic field conductor unit can be formed separately with respect to the heat conductance device and/or the induction coil and/or a power electronics unit.

The heat conductance device can be formed separately with respect to the induction coil and/or a power electronics unit.

The induction coil can be formed separately with respect to a power electronics unit.

Through the heat conductance device for example a simpler mounting results by avoiding a casting process. With the use of heat-conducting elements in the form of gap pads, no hardening time is present, so that the mounting time can be shortened. In addition, through a dispensing with a casting process, the occurrence of mechanical stresses (inherent stresses) during a hardening process can be avoided. A partially introduced thermal interface enables an optimizing of weight and cost of the induction charging device.

Heat-conducting elements of the heat conductance device can also be formed respectively for example by several similar or different part heat-conducting elements, which can be arranged with respect to the axial axis lying on one another and/or in a contacting manner, in particular in a mechanically contacting manner.

In an advantageous further development of the solution according to the invention provision is made that at least one power electronics unit is arranged in the housing interior. Provision can be made that several power electronics units, spaced apart from one another with respect to a lateral axis, are arranged in the housing interior. The at least one power electronics unit or several power electronics units can be arranged in the first part housing interior. Between the at least one power electronics unit and the magnetic field conductor unit, the cooling device can be arranged with respect to the axial axis. Between the at least one power electronics unit and the induction coil, the cooling device can be arranged with respect to the axial axis. Therefore, the at least one power electronics unit can be situated on a different side of the cooling device than the magnetic field conductor unit and the induction coil. The at least one power electronics unit can form electrical and/or electronic power circuit elements.

In a further advantageous embodiment of the solution according to the invention, provision is made that the at least one power electronics unit and the cooling device are arranged spaced apart from one another with respect to the axial axis, wherein at least one heat conductance device is formed by a heat-conducting device on the electronics side, which is arranged with respect to the axial axis between the at least one power electronics unit and the cooling device, wherein the heat conductance device on the electronics side is at least partially arranged on the power electronics unit and on the cooling device, wherein the heat conductance device on the electronics side has an axial thermal conductivity with respect to the axial axis, wherein the axial thermal conductivity of the heat conductance device on the electronics side varies at least partially with respect to at least one lateral axis.

The heat conductance device on the electronics side can be the heat conductance device which is arranged with respect to the axial axis between the at least one power electronics unit and the cooling device. A first heat conductance device can be understood to be a heat conductance device on the electronics side.

The heat conductance device on the electronics side can be arranged at least partially directly or indirectly on the power electronics unit and on the cooling device. The heat conductance device on the electronics side can be arranged at least partially abutting in a directly contacting manner on the power electronics unit and on the cooling device. The heat conductance device on the electronics side can contact the power electronics unit and the cooling device at least partially directly in a mechanical manner. The heat conductance device on the electronics side can be connected with the power electronics unit and with the cooling device at least partially in a materially bonded manner.

Several power electronics units can be formed, which are arranged spaced apart from the cooling device with respect to the axial axis, wherein the heat conductance device on the electronics side can be arranged between these several power electronics units and the cooling device.

The heat conductance device on the electronics side forms at least one heat conductance device of the induction charging device. Therefore, with respect to the formation of the heat conductance device on the electronics side, reference is to be made to the preceding description with regard to the heat conductance device.

The heat conductance device on the electronics side can be formed separately with respect to the housing and/or the cooling device and/or the magnetic field conductor unit and/or the heat conductance device and/or the induction coil and/or a power electronics unit.

Through the heat conductance device on the electronics side, the heat path from the at least one power electronics unit or from several power electronics units to the cooling device can be improved and/or optimized.

In an advantageous further development of the solution according to the invention, provision is made that the cooling device and the magnetic field conductor unit are arranged spaced apart from one another with respect to the axial axis, wherein at least one heat conductance device is formed by a heat conductance device on the magnetic field conductor side, which Is arranged with respect to the axial axis between the cooling device and the magnetic field conductor unit, wherein the heat conductance device on the magnetic field conductor side is arranged at least partially on the cooling device and on the magnetic field conductor unit, wherein the heat conductance device on the magnetic field conductor side has an axial thermal conductivity with respect to the axial axis, wherein the axial thermal conductivity of the heat conductance device on the magnetic field conductor side varies at least partially with respect to at least one lateral axis.

The heat conductance device on the magnetic field conductor side can be the heat conductance device which is arranged with respect to the axial axis between the cooling device and the magnetic field conductor unit. A second heat conductance device can be understood to be a heat conductance device on the magnetic field conductor side.

The heat conductance device on the magnetic field conductor side can be arranged at least partially directly or arranged indirectly on the cooling device and on the magnetic field conductor unit. The heat conductance device on the magnetic field conductor side can be arranged at least partially abutting in a directly contacting manner on the cooling device and on the magnetic field conductor unit. The heat conductance device on the magnetic field conductor side can contact the cooling device and the magnetic field conductor unit at least partially in a mechanically direct manner. The heat conductance device on the magnetic field conductor side can be connected at least partially in a materially bonded manner with the cooling device and with the magnetic field conductor unit.

The heat conductance device on the magnetic field conductor side forms at least one heat conductance device of the induction charging device. Therefore with respect to the formation of the heat conductance device on the magnetic field conductor side, reference is to be made to the preceding description with regard to the heat conductance device.

The heat conductance device on the magnetic field conductor side can be formed separately with respect to the heat conductance device on the electronics side and/or the housing and/or the cooling device and/or the magnetic field conductor unit and/or the heat conductance device and/or the induction coil and/or a power electronics unit.

Through the heat conductance device on the magnetic field conductor side, the heat path from the magnetic field conductor unit to the cooling device can be improved and/or optimized.

A locally adapted thermal connection of the magnetic field conductor unit or respectively the ferrites to the cooling device enables a more homogeneous heating or respectively temperature distribution (therefore, that smaller temperature gradients are formed), so that smaller thermo-mechanical stresses of the magnetic field conductor unit or respectively of the ferrites are formed.

In a further advantageous embodiment of the solution according to the invention, provision is made that the magnetic field conductor unit and the at least one induction coil are arranged spaced apart from one another with respect to the axial axis, wherein at least one heat conductance device is formed by a heat conductance device on the coil side, which is arranged with respect to the axial axis between the magnetic field conductor unit and the at least one induction coil, wherein the heat conductance device on the coil side is arranged at least partially on the magnetic field conductor unit and on the at least one induction coil.

The heat conductance device on the coil side can be the heat conductance device which is arranged with respect to the axial axis between the magnetic field conductor unit and the at least one induction coil. A third heat conductance device can be understood to be a heat conductance device on the coil side.

The heat conductance device on the coil side can be arranged at least partially directly or arranged indirectly on the magnetic field conductor unit and on the at least one induction coil. The heat conductance device on the coil side can be arranged on the magnetic field conductor unit and on the at least one induction coil in an at least partially directly contacting abutting manner. The heat conductance device on the coil side can contact the magnetic field conductor unit and the at least one induction coil in an at least partially mechanically direct manner. The heat conductance device on the coil side can be connected with the magnetic field conductor unit and with the at least one induction coil in an at least partially materially bonded manner.

The heat conductance device on the coil side can be formed separately with respect to the heat conductance device on the magnetic field conductor side and/or the heat conductance device on the electronics side and/or the housing and/or the cooling device and/or the magnetic field conductor unit and/or the heat conductance device and/or the induction coil and/or a power electronics unit.

Through the heat conductance device on the coil side, the heat path from the induction coil via the magnetic field conductor unit to the cooling device can be improved and/or optimized.

In an advantageous further development of the solution according to the invention, provision is made that the heat conductance device on the coil side has an axial thermal conductivity with respect to the axial axis, wherein the axial thermal conductivity of the heat conductance device on the coil side varies at least partially with respect to at least one lateral axis, and/or that the heat conductance device on the coil side is formed continuously or at least partially according to a winding path of the at least one induction coil, and/or that the heat conductance device on the coil side is formed so that each coil section of the at least one induction coil, which lies opposite the magnetic field conductor unit with respect to the axial axis, is connected in a thermally contacting manner with the magnetic field conductor unit via at least one section of the heat conductance device on the coil side.

At regions of the magnetic field conductor unit, at which with respect to the axial axis no induction coil, in particular no litz wire of the induction coil, is arranged, thermally insulating regions can be formed. The insulating regions can be air regions. These air regions can be filled for example by a casting compound of non-heat-conductive material during a casting process. The insulating regions can be formed as casting compound.

At regions of the magnetic field conductor unit, at which with respect to the axial axis the induction coil, in particular a litz wire of the induction coil, is arranged, heat-conducting regions and/or heat-conducting elements can be formed.

The third heat conductance device can partially or completely fill by heat-conducting regions and/or heat-conducting elements the space which is formed between the induction coil and the magnetic field conductor unit with respect to the axial axis.

In the case of a heat conductance device on the coil side, formed continuously or at least partially according to the winding path of the at least one induction coil, the heat conductance device on the coil side can have a heat-conducting region and/or heat-conducting element formed continuously or at least partially according to the winding path of the at least one induction coil. Such a formed heat-conducting region and/or such a formed heat-conducting element can be arranged with respect to the axial axis between the induction coil and the magnetic field conductor unit. Such a formed heat-conducting region and/or such a formed heat-conducting element can be formed having one piece and/or one part continuously with respect to the winding path of the at least one induction coil. Such a formed heat-conducting region and/or such a formed heat-conducting element can be arranged and/or applied on the magnetic field conductor unit. In particular, such a formed heat-conducting region and/or such a formed heat-conducting element can be applied on the magnetic field conductor unit via a coating method and/or a printing method.

In the case of a heat-conducting region formed continuously according to the winding path of the at least one induction coil and/or heat-conducting element of the heat conductance device on the coil side, the thermal conductivity of the heat conductance device on the coil side can be constant or can partially vary with respect to the axial axis along the winding path.

In the case of a heat conductance device on the coil side, formed continuously or at least partially according to a winding path of the at least one induction coil, the heat conductance device on the coil side can be arranged and/or applied according to the winding path of the at least one induction coil on the magnetic field conductor unit, in particular arranged and/or applied in a precisely fitting manner and/or in a directionally precise or respectively directionally stable manner with respect to the winding path.

Hereby, either a casting of the entire housing, in particular of the induction coil in the housing, can be dispensed with, or a favourable, non-thermally-conductive material of casting compound can be used.

With a dispensing of an additional casting, a soft mounting of the magnetic field conductor unit or respectively of the ferrites is produced, so that a better load-bearing behaviour and small stresses can be achieved. A directionally precise thermal connection of the induction coil or respectively of the litz wire enables a saving on material and costs.

In a further advantageous embodiment of the solution according to the invention, provision is made that at least one heat conductance device, in particular the heat conductance device on the electronics side and/or the heat conductance device on the magnetic field conductor side and/or the heat conductance device on the coil side, forms at least partially a linear variations and/or partially a non-linear variations and/or partially a stepped variations and/or partially a discontinuous variations of the thermal conductivity with respect to the axial axis along at least one lateral axis.

Hereby for example an adaptation can take place of the thermal resistance and/or of the axial thermal conductivity with respect to a reduction in costs and/or materials.

In an advantageous further development of the solution according to the invention, provision is made that at least one heat conductance device, in particular the heat conductance device on the electronics side and/or the heat conductance device on the magnetic field conductor side and/or the heat conductance device on the coil side, is formed by several heat-conducting elements, wherein at least two heat-conducting elements are arranged spaced apart from one another with respect to at least one lateral axis. A thermal insulating region, in particular an air region, can be formed between the at least two spaced-apart heat-conducting elements.

The heat conductance device, in particular the heat conductance device on the electronics side and/or the heat conductance device on the magnetic field conductor side and/or the heat conductance device on the coil side, can be formed by several separate heat-conducting elements which can be arranged spaced apart from one another by thermal insulating regions with respect to at least one lateral axis. The thermal insulating regions can be formed as air regions. The air regions can be filled exclusively by air. The several heat-conducting elements can be arranged spaced apart from one another with respect to at least one lateral axis, wherein an insulating region is arranged respectively between the heat-conducting elements. The several heat-conducting elements can have different distances with respect to at least one lateral axis. The several heat-conducting elements can have substantially equidistant distances with respect to at least one lateral axis.

The heat-conducting elements can form a targeted and/or partially applied thermally conductive interface. The heat-conducting elements can be at least partially connected in a materially bonded manner with at least one component of the induction charging device arranged within the housing interior. The heat-conducting elements can be formed e.g. as a gap pad, in particular as a self-adhesive gap pad, and/or as adhesive and/or as ceramic and/or as a substrate containing ceramic and/or as a coating. The application of the heat-conducting elements can take place via a particularly suitable process with regard to the thermal transition (e.g. sintering, soldering, bonding, welding). Hereby, an expensive casting, in terms of weight and cost, with heat-conductive casting compound can be avoided.

The heat-conducting elements can have a thermal conductivity of at least 0.5 W/m·K, in particular of at least 1 W/m·K, in particular of at least 10 W/m·K. Thermal insulating regions can have a thermal conductivity of less than 0.5 W/m·K, in particular of less than 0.2 W/m·K. Thermal insulating regions can have a thermal conductivity of air.

(A9) In a further advantageous embodiment of the solution according to the invention, provision is made that at least one heat conductance device in particular the heat conductance device on the electronics side and/or the heat conductance device on the magnetic field conductor side and/or the heat conductance device on the coil side, has at least one heat-conducting element with an anisotropic thermal conductivity, and/or that at least one heat conductance device, in particular the heat conductance device on the electronics side and/or the heat conductance device on the magnetic field conductor side and/or the heat conductance device on the coil side, has at least one heat-conducting element with a lateral thermal conductivity with respect to at least one lateral axis, which is greater than an axial thermal conductivity of the heat-conducting element with respect to the axial axis.

Such a heat-conducting element can be formed for example as a heat spreader and/or as graphite foil. A heat-conducting element with anisotropic thermal conductivity, in particular with a higher lateral than axial thermal conductivity, can have a lateral extent which is greater than a lateral extent of the region of the component which is to be cooled, in which the heat flux density exceeds a threshold value. Thereby, the heat flux density can be reduced in the thermal path up to the cooling body which is able to be flowed through by fluid, which brings about advantages in the technical design of the fluid guidance.

A heat-conducting element can be formed by a combination of a heat-conducting element with isotropic thermal conductivity and a heat-conducting element with anisotropic thermal conductivity, in particular with a higher lateral thermal conductivity than axial thermal conductivity. These heat-conducting elements can be formed lying on one another with respect to the axial direction.

In an advantageous further development of the solution according to the invention, provision is made that at least one heat conductance device, in particular the heat conductance device on the electronics side and/or the heat conductance device on the magnetic field conductor side and/or the heat conductance device on the coil side, has at least one heat-conducting element with a heat pump, and/or that at least one heat conductance device, in particular the heat conductance device on the electronics side and/or the heat conductance device on the magnetic field conductor side and/or the heat conductance device on the coil side, has at least one heat-conducting element with a thermoelectric heat pump, and/or that at least one heat conductance device, in particular the heat conductance device on the electronics side and/or the heat conductance device on the magnetic field conductor side and/or the heat conductance device on the coil side, has at least one heat-conducting element with a heat pump, wherein through the heat pump a transport of heat is formed through a phase transition of a refrigerant or coolant encapsulated in the heat pump. For this, the heat pump can have an evaporation chamber or respectively an evaporation zone, which can be formed with respect to the lateral axis between two condensation chambers or respectively condensation zones formed by the heat pump. As this heat pump can have a greater lateral extent than, for example, an electronics component, hereby also a reduction of the heat flux density can be enabled, in which an integrally formed heat spreader is provided. The heat pump can be connected to an electronics component via a heat-conducting element. The heat pump can be connected to the cooling device for example in a materially bonded manner, in particular by soldering. The encapsulated refrigerant or coolant can evaporate in the evaporation chamber or respectively in the evaporation zone. The encapsulated refrigerant or coolant can condense in the condensation chambers or respectively in the condensation zones.

A heat pump, in particular an active heat pump, can be formed as a heat pipe, thermosiphon or as a thermoelectric heat pump. A thermoelectric heat pump can comprise one or more thermoelectric elements, in particular doped semiconductor elements. One or more doped semiconductor elements can form at least partially a Peltier element.

Thermoelectric heat pumps can be supplied electrically directly via the power electronics unit, in particular a circuit board of the power electronics, and/or coupled with a thermosensor which actively connects or respectively switches on the heat pump only when required.

Each heat pump, in particular each active heat pump, can be formed from one or more heat pump units of identical or different construction. The aim of this heat pump can be both the improvement of the cooling itself (longitudinal pumping direction of the heat along the axial axis) and also the reduction of the heat flux density (lateral pumping direction of the heat along at least one lateral axis) with extremely high heat loss sources.

The longitudinal pumping direction can be the direction perpendicularly to the surface, in particular to a planar and/or flat main cooling surface, of the cooling device, in particular of the cooling body and/or of the cooling plate. The lateral pumping direction can be any direction parallel to the surface, in particular to a planar and/or flat main cooling surface, of the cooling device, in particular of the cooling body and/or of the cooling plate. Provision can be made that each form of heat pumps also combine both pumping directions.

Hereby, a lower maximum operating temperature can be achieved in particularly lossy components (e.g. in the power electronics) through active heat dissipation via heat pumps. Hereby, the costs can be reduced and a greater lifespan of the lossy components can be achieved.

A heat pump can form at least one materially bonded connection layer, in order to enable a connection to the components of the induction charging device. Here, provision can be made that such a connection layer forms a thermal resistance and/or a thermal transmission resistance less than 200 mm$^2$·K/W. Provision can also be made that the materially bonded connection layer forms a ceramic-based materially bonded connection (e.g. silver sintering), which in particular also provides values <20 mm$^2$·K/W.

The layer thickness with respect to the axial axis of the connection layer can be less than or equal to 1 mm, in particular less than or equal to 100 □m. The layer thickness with respect to the axial axis can lie for example in the range 10 □m to 100 □m, in particular in the range of 20 □m to 80 □m, in particular in the range of 40 □m to 60 □m. The layer thickness with respect to the axial axis can be 50 □m, for example.

A heat pump can integrally form a heat spreader.

In a further advantageous embodiment of the solution according to the invention, provision is made that at least one heat conductance device, in particular the heat conductance device on the electronics side and/or the heat conductance device on the magnetic field conductor side and/or the heat conductance device on the coil side, has a variation of the thermal conductivity which is formed so that the components which are to be cooled, in particular the power electronics unit and/or the magnetic field conductor unit and/or the induction coil, of the induction charging device form a substantially homogeneous temperature distribution.

At least one heat conductance device, in particular the heat conductance device on the electronics side and/or the heat conductance device on the magnetic field conductor side and/or the heat conductance device on the coil side, can have a variation of the axial thermal conductivity, which is formed so that the components which are to be cooled, in particular the power electronics unit and/or the magnetic field conductor unit and/or the induction coil, of the induction charging device form a substantially homogeneous temperature distribution.

For this, provision can be made that the resulting heat flux densities of the components of the induction charging device which are to be cooled are determined by measurements and/or calculations and/or simulations. Depending on a first predefined threshold vale of the heat flux densities, either a thermal insulating region or a heat-conducting element or heat-conducting region can be arranged at the components of the induction charging device which are to be cooled. At regions with a heat flux density below or equal to the first predefined threshold value, thermal insulating regions can be formed. At regions with a heat flux density above the first predefined threshold value, heat-conducting elements or heat-conducting regions can be formed. Therefore, at regions with a heat flux density below or equal to the first predefined threshold value and at regions with a heat flux density above the first predefined threshold value, such a heat dissipation can be achieved that the temperature gradient occurring between these regions is at least reduced.

A second predefined threshold value can be defined, starting from which the use of a heat pump can be advantageous. The second predefined threshold value can be greater than the first predefined threshold value.

Heat-conducting elements free of a heat pump can be formed at regions with a heat flux density below or equal to the second predefined threshold value and above the first predefined threshold value. Heat-conducting elements with a heat pump can be formed at regions with a heat flux density above the second predefined threshold value.

The first predefined threshold value can be 5 W/cm$^2$ and the second predefined threshold value can be 15 W/cm$^2$.

In an advantageous further development of the solution according to the invention, provision is made that at least one heat conductance device, in particular the heat conductance device on the electronics side and/or the heat conductance device on the magnetic field side and/or the heat conductance device on the coil side, has at least one heat-conducting element at regions which have at least temporarily a heat flux density of at least 5 W/cm$^2$, and/or that at least one heat conductance device, in particular the heat conductance device on the electronics side and or the heat conductance device on the magnetic field conductor side and/or the heat conductance device on the coil side, has at least one heat-conducting element with an anisotropic thermal conductivity at regions which have at least temporarily a heat flux density of at least 5 W/cm$^2$, and/or that at least one heat conductance device, in particular the heat conductance on the electronics side and/or the heat conductance device on the magnetic field side and/or the heat conductance device on the coil side, has at least one heat-conducting element with a heat pump at regions which at least temporarily have a heat flux density of at least 15 W/cm$^2$.

The regions refer to the components which are to be cooled, in particular the power electronics unit and/or the magnetic field conductor unit and/or the induction coil, of the induction charging device.

In a further advantageous embodiment of the solution according to the invention, provision is made that at least one heat conductance device, in particular the heat conductance device on the electronics side and/or the heat conductance device on the magnetic field conductor side and/or the heat conductance device on the coil side, and/or at least one of its heat-conducting elements is self-adhesive. Provision can be made that all the heat-conducting elements are self-adhesive. The heat-conducting elements can form two self-adhesive surfaces which are spaced apart with respect to the axial axis. This enables a simple and cost-effective manufacture.

In an advantageous further development of the solution according to the invention, provision is made that at least one heat conductance device, in particular the heat conductance device on the electronics side and/or the heat conductance device on the magnetic field conductor side and/or the heat conductance device on the coil side, is formed from an electrically insulating heat-conducting material. In particular the heat conductance device on the coil side and/or its heat-conducting elements is/are formed in a completely electrically insulating manner. The heat conductance device on the electronics side and/or its heat-conducting elements is/are formed in a completely electrically insulating manner when the power electronics unit has no insulating plate and/or when the cooling device is formed from electrically conductive material.

In an advantageous further development of the solution according to the invention, provision is made that the housing is formed by a casting compound and/or that the housing interior is at least partially or completely filled with casting compound. The housing and the housing interior can be formed by the same hardened or respectively common casting compound. The casting compound can have a poorer thermal conductivity than the heat conductance device and/or its heat-conducting elements and/or its heat-conducting regions.

The housing, which forms a housing interior, can be formed having one piece and/or one part. The one-piece and/or one-part housing can be formed by a casting compound, in particular by a hardened casting compound. The housing interior of the one-piece and/or one-part housing can be filled at least partially or completely with casting compound. The housing interior can be fluidically sealed with respect to an environment of the induction charging device.

The invention further relates to a vehicle charging system with a stationary induction charging station, which is formed at least partially by an induction charging device according to the invention, and/or with a vehicle, which has an on-board induction charging device which is formed at least partially by an induction charging device according to the invention, wherein the vehicle charging system is formed for wireless energy transfer from the stationary induction charging station to the on-board induction charging device of the vehicle. For this, the stationary induction charging station can be connected with a stationary energy source. The stationary induction charging station can be, for example, buried in the road surface or mounted thereon. The stationary induction charging station can form a primary coil, while the induction charging device of the vehicle can form a secondary coil.

The invention further relates to a vehicle for a vehicle charging system according to the invention. The vehicle comprises an on-board induction charging device, which is formed at least partially by an induction charging device according to the invention, and a traction battery unit, which is coupled electrically with the on-board induction charging device, wherein the on-board induction charging device is formed for the supplying of the traction battery unit with electrical energy.

The vehicle can be an electrically driven vehicle with at least one rotating electric machine, wherein the rotating electric machine provides for the drive of the vehicle and in so doing is supplied with electrical energy via the traction battery unit. The vehicle can be a road vehicle, in particular a trackless road vehicle. The vehicle can be an electric vehicle, a hybrid vehicle, or a plug-in hybrid vehicle.

The on-board induction charging device can be arranged in the vehicle in the vicinity of a road surface. Provision can be made that the induction coil of the on-board induction charging device is arranged nearer to the road surface than the cooling device.

The on-board induction charging device can have an integrated power electronics unit.

The invention further relates to a stationary induction charging station for a vehicle charging system according to the invention. The stationary induction charging station is formed at least partially by an induction charging device according to the invention, wherein the stationary induction charging station is formed for the wireless energy transfer to the on-board induction charging device of the vehicle. The stationary induction charging station can be connected with a stationary energy source in an electrically conducting manner. The stationary induction charging station can have an integrated power electronics unit or a separate and spatially separated power electronics unit.

The stationary induction charging station can be buried partially or completely in the road surface. The stationary induction charging station can rest on the road surface.

Provision can be made that the induction coil of the stationary induction charging station is arranged nearer to the vehicle than the cooling device.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively schematically

DETAILED DESCRIPTION

Figure 1:
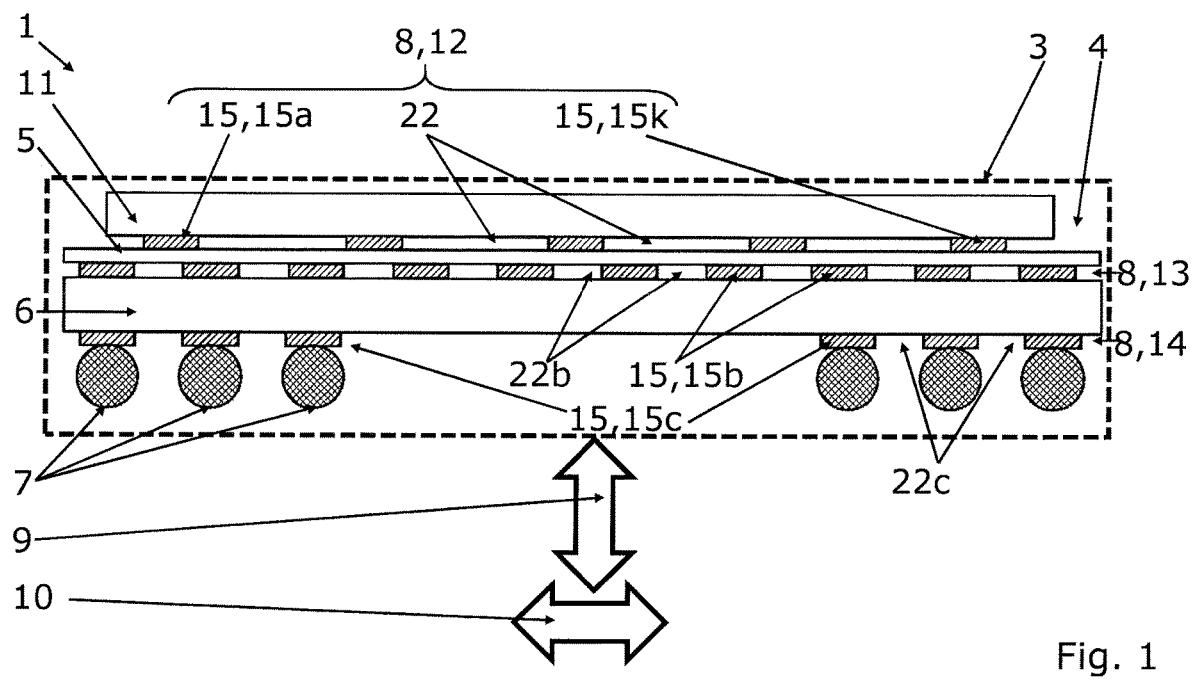
FIG. 1 shows a first example embodiment of an induction charging device according to the invention, with a power electronics unit.
Figure 8:
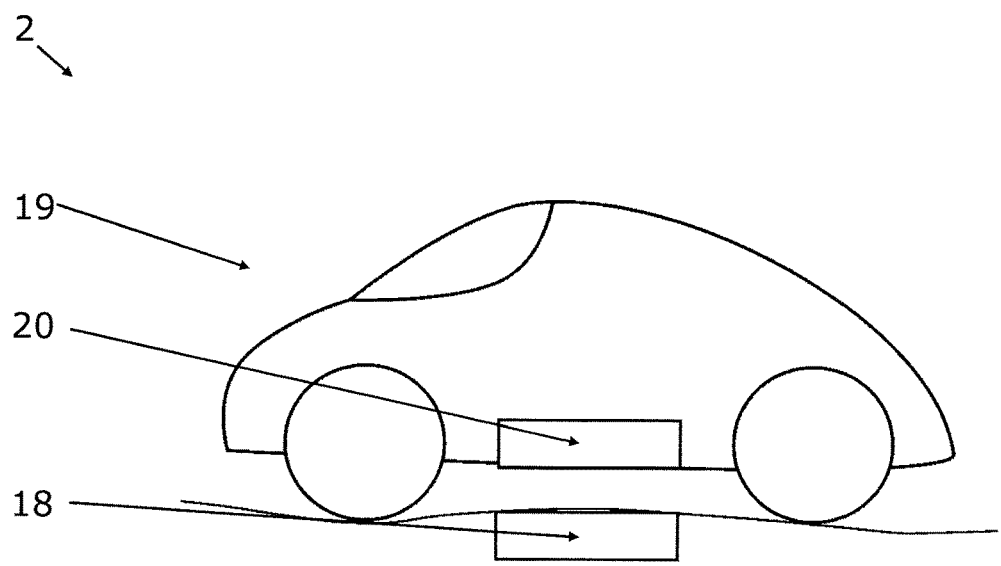
FIG. 8 shows a vehicle charging system according to the invention.

FIG. 1 shows an induction charging device 1 for a vehicle charging system 2, which is illustrated in FIG. 8. The induction charging device 1 has a housing 3, which forms a housing interior 4.

In the housing interior 4 there is arranged a cooling device 5 for cooling the induction charging device 1, a magnetic field conductor unit 6 for magnetic field directing, and at least one induction coil 7 for wireless energy transfer with a predetermined transmission power.

In the housing interior 4 at least one heat conductance device 8 is formed, which is formed with respect to an axial axis 9 between at least two components of the induction charging device 1 arranged within the housing interior 4. The thermal conductivity of the at least one heat conductance device 8 with respect to the axial axis 9 varies at least partially along at least one lateral axis 10 aligned substantially perpendicularly and/or transversely to the axial axis 9. A second lateral axis, which is not illustrated, can be aligned substantially perpendicularly to the axial axis 9 and substantially perpendicularly to the lateral axis 10. Such two lateral axes can define a lateral plane, which can be aligned substantially perpendicularly and/or orthogonally to the axial axis 9.

Furthermore, at least one power electronics unit 11 is arranged in the housing interior 4. In an example embodiment which is not illustrated, however, provision can also be made that no power electronics unit is arranged in the housing interior 4.

The at least one power electronics unit 11 and the cooling device 5 are arranged spaced apart from one another with respect to the axial axis 9, wherein a heat conductance device 12 on the electronics side is arranged with respect to the axial axis 9 between the at least one power electronics unit 11 and the cooling device 5. The heat conductance device 12 on the electronics side contacts, for example, the power electronics unit 11 and the cooling device 5 at least partially in a mechanically direct manner.

The cooling device 5 and the magnetic field conductor unit 6 are arranged spaced apart from one another with respect to the axial axis 9, wherein a heat conductance device 13 on the magnetic field conductor side is arranged with respect to the axial axis 9 between the cooling device 5 and the magnetic field conductor unit 6. The heat conductance device 13 on the magnetic field conductor side contacts, for example, the cooling device 5 and the magnetic field conductor unit 6 at least partially in a mechanically direct manner.

The magnetic field conductor unit 6 and the at least one induction coil 7 are arranged spaced apart from one another with respect to the axial axis 9, wherein a heat conductance device 14 on the coil side is arranged with respect to the axial axis 9 between the magnetic field conductor unit 6 and the at least one induction coil 7. The heat conductance device 14 on the coil side contacts the magnetic field conductor unit 6 and the at least one induction coil 7 at least partially in a mechanically direct manner.

The axial thermal conductivity of the heat conductance device 12 on the electronics side with respect to the axial axis 9 varies at least partially along at least one lateral axis 10. For this, the heat conductance device 12 on the electronics side has several heat-conducting elements 15,15a, spaced apart from one another with respect to the lateral axis 10, wherein thermal insulating regions 22 are formed between the spaced-apart heat-conducting elements 15,15a. These thermal insulating regions 22 can be formed for example as exclusive air regions. However, it is also conceivable that these thermal insulating regions 22 are formed by, for example, a casting compound and/or a base material, which has a poorer thermal conductivity than the heat-conducting elements 15, 15a. In FIG. 1 by way of example for the heat conductance device 12 on the electronics side two exterior heat-conducting elements, with respect to the lateral axis 10, of 15a and 15k are provided with separate reference numbers. Each heat conductance device can have two exterior heat-conducting elements with respect to the lateral axis 10, wherein these are not provided hereinafter with separate reference numbers. The heat-conducting elements 15, 15a are arranged in FIG. 1 with respect to the lateral axis 10 in a substantially equidistant manner. In the following description and in the following figures, the heat-conducting elements of the heat conductance device 12 on the electronics side are designated by the reference number 15a.

The axial thermal conductivity of the heat conductance device 13 on the magnetic field conductor side with respect to the axial axis 9 varies at least partially along at least one lateral axis 10. For this, the heat conductance device 13 on the magnetic field conductor side has several heat-conducting elements 15b, spaced apart from one another with respect to the lateral axis 10, wherein thermal insulating regions 22b are formed between the spaced-apart heat-conducting elements 15b. These thermal insulating regions 22b can be formed, for example, as exclusive air regions. However, it is also conceivable that these thermal insulating regions 22b are formed by, for example, a casting compound and/or a base material, which has a poorer thermal conductivity than the heat-conducting elements 15b. The heat-conducting elements 15b are arranged in FIG. 1 in a substantially equidistant manner with respect to the lateral axis 10. In the following description and in the following figures, the heat-conducting elements of the heat conductance device 13 on the magnetic field conductor side are designated with the reference number 15b.

The axial thermal conductivity of the heat conductance device 14 on the coil side with respect to the axial axis 9 varies at least partially along at least one lateral axis 10. For this, the heat conductance device 14 on the coil side has several heat-conducting elements 15c, spaced apart from one another with respect to the lateral axis 10, wherein thermal insulating regions 22c are formed between the spaced-apart heat-conducting elements 15c. These thermal insulating regions 22c can be formed for example as exclusive air regions. However, it is also conceivable that these thermal insulating regions 22c are formed by, for example, a casting compound and/or a base material, which has a poorer thermal conductivity than the heat-conducting elements 15c. The heat-conducting elements 15c are arranged at least partially in a substantially equidistant manner in FIG. 1 with respect to the lateral axis 10, however between the exterior heat-conducting elements 15c with respect to the lateral axis 10 as a whole a non-equidistant or respectively a varying spacing is formed. In the following description and in the following figures, the heat-conducting elements of the heat conductance device 14 on the coil side are designated by the reference number 15c.

The heat-conducting element 15c can be formed continuously following a winding path of the at least one induction coil 7. In such a case, the heat-conducting element 15c is formed continuously along the winding path of the at least one induction coil 7, wherein in a view in the plane of the drawing (spanned through the axial axis 9 and lateral axis 10) of the illustrated figures, such a continuous heat-conducting element 15 forms several heat-conducting elements 15c, spaced apart from one another with respect to the lateral axis 10, in particular heat-conducting element sections 15c.

Figure 2:
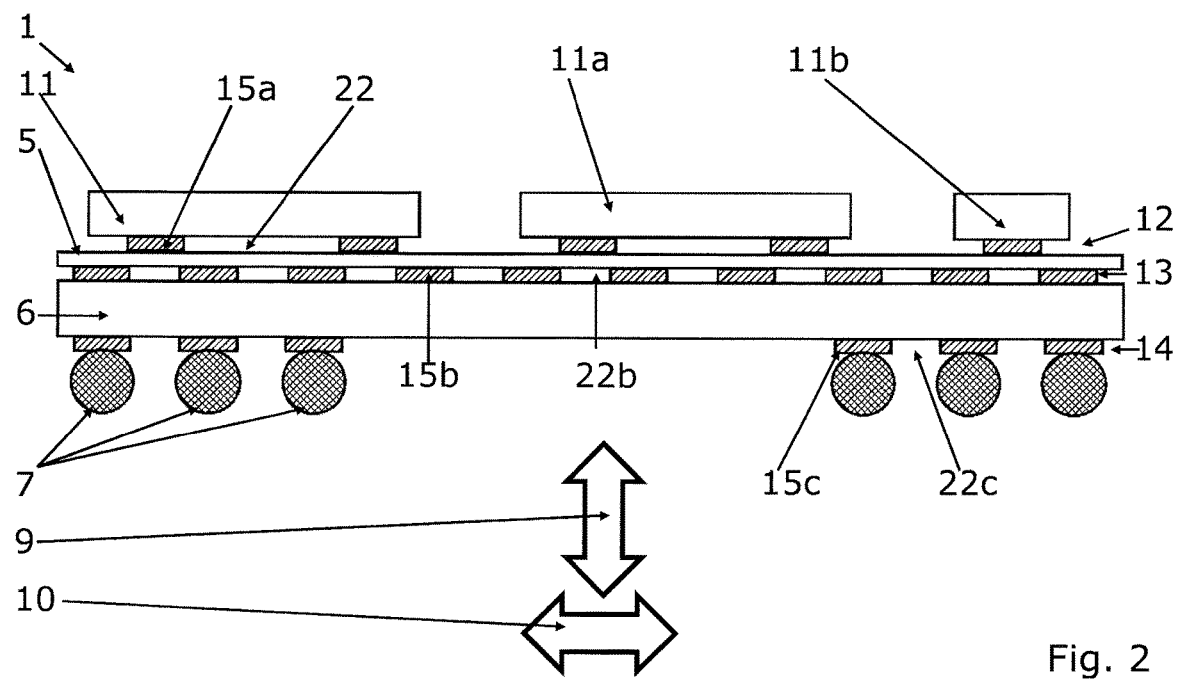
FIG. 2 shows a second example embodiment of an induction charging device according to the invention, with several power electronics units.

In FIG. 2, compared to FIG. 1, several power electronics devices 11, 11a and 11b are arranged in the housing interior 4, wherein these power electronics devices are arranged spaced apart from one another with respect to the lateral axis 10.

The power electronics devices 11, 11a, and 11b are arranged spaced apart from the cooling device 5 with respect to the axial axis 9, wherein the heat conductance device 12 on the electronics side with respect to the axial axis 9 is arranged at least partially between the respective power electronics unit 11, 11a, 11b and the cooling device 5. The heat conductance device 12 on the electronics side contacts the power electronics unit 11a and the cooling device 5 at least partially in a mechanically direct manner. The heat conductance device 12 on the electronics side contacts the power electronics unit 11b and the cooling device 5 at least partially in a mechanically direct manner. The heat conductance device 12 on the electronics side contacts the power electronics unit 11 and the cooling device 5 at least partially in a mechanically direct manner.

Figure 3:
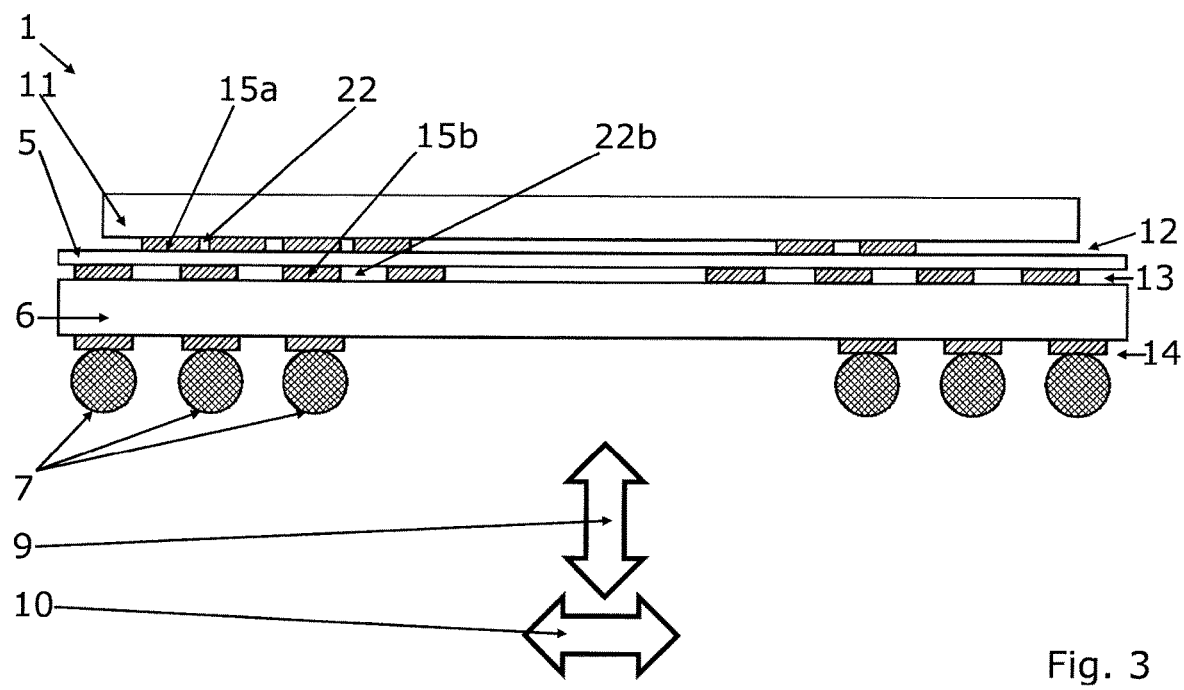
FIG. 3 shows a third example embodiment of an induction charging device according to the invention, with a power electronics unit.

Compared to FIG. 1, the heat conductance device 12 on the electronics side and the heat conductance device 13 on the magnetic field conductor side in FIG. 3 have a non-equidistant or respectively a varying spacing of the heat-conducting elements 15a or respectively 15b with respect to the lateral axis 10. Hereby, a variation of the thermal conductivity can be provided, which is formed so that the components which are to be cooled, in particular the power electronics unit 11 and/or the magnetic field conductor unit 6 and/or the induction coil 7, of the induction charging device 1 form a substantially homogeneous temperature distribution.

Figure 4:
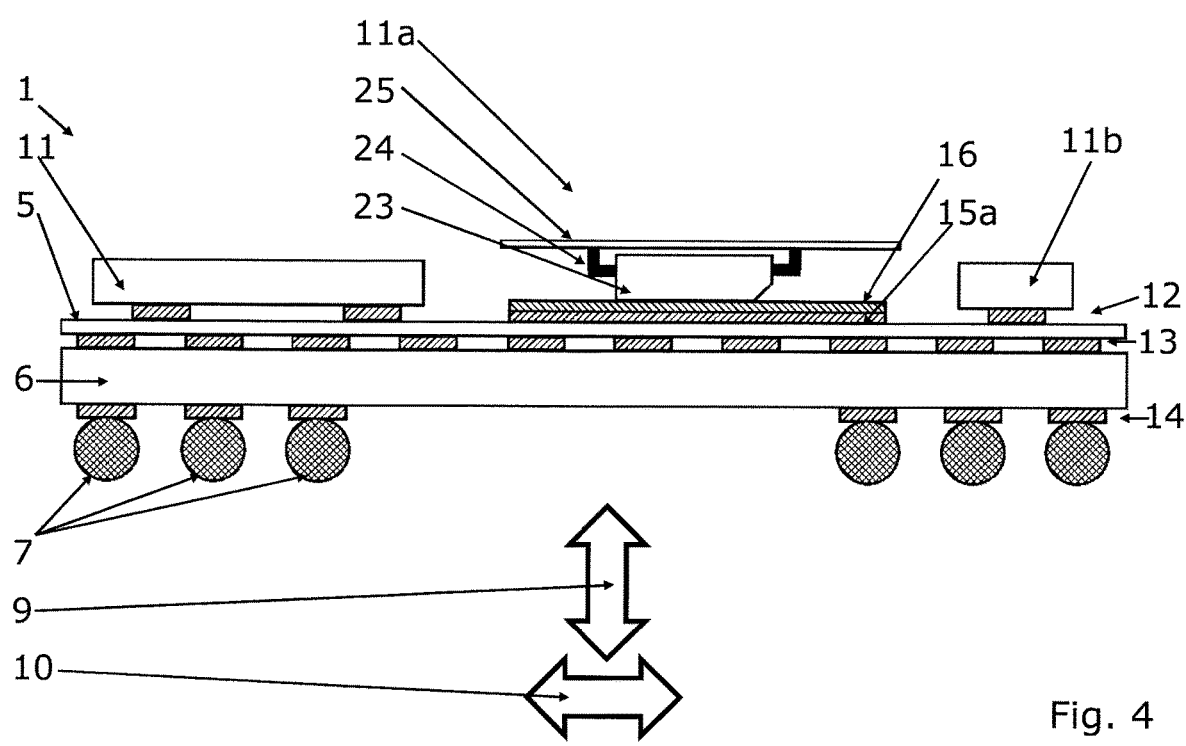
FIG. 4 shows a fourth example embodiment of an induction charging device according to the invention, with a heat-conducting element with anisotropic thermal conductivity.

As a difference to FIG. 2, FIG. 4 shows that the heat conductance device 12 on the electronics side has at least one heat-conducting element 16 with an anisotropic thermal conductivity. This heat-conducting element 16 can also be designated as a heat spreader. The heat-conducting element 16 can have a lateral thermal conductivity with respect to at least one lateral axis 10, which is greater than an axial thermal conductivity of the heat-conducting element 16 with respect to the axial axis 9.

The power electronics unit 11a is formed, by way of example, partially by a circuit board 25, which forms via electrical contacts 24 an electrical power supply of an electronics component 23. The electronics component 23 has, for example, a high heat flux density which can be reduced via the heat-conducting element 16. For this, provision can be made that the heat-conducting element 16 has a greater lateral extent than the lateral extent of the region of the electronics component 23, which lies against the heat-conducting element 16 in a mechanically directly contacting manner. Between the heat-conducting element 16 and the cooling device 5 with respect to the axial axis 9 a heat-conducting element 15a with isotropic thermal conductivity can be arranged.

Figure 5:
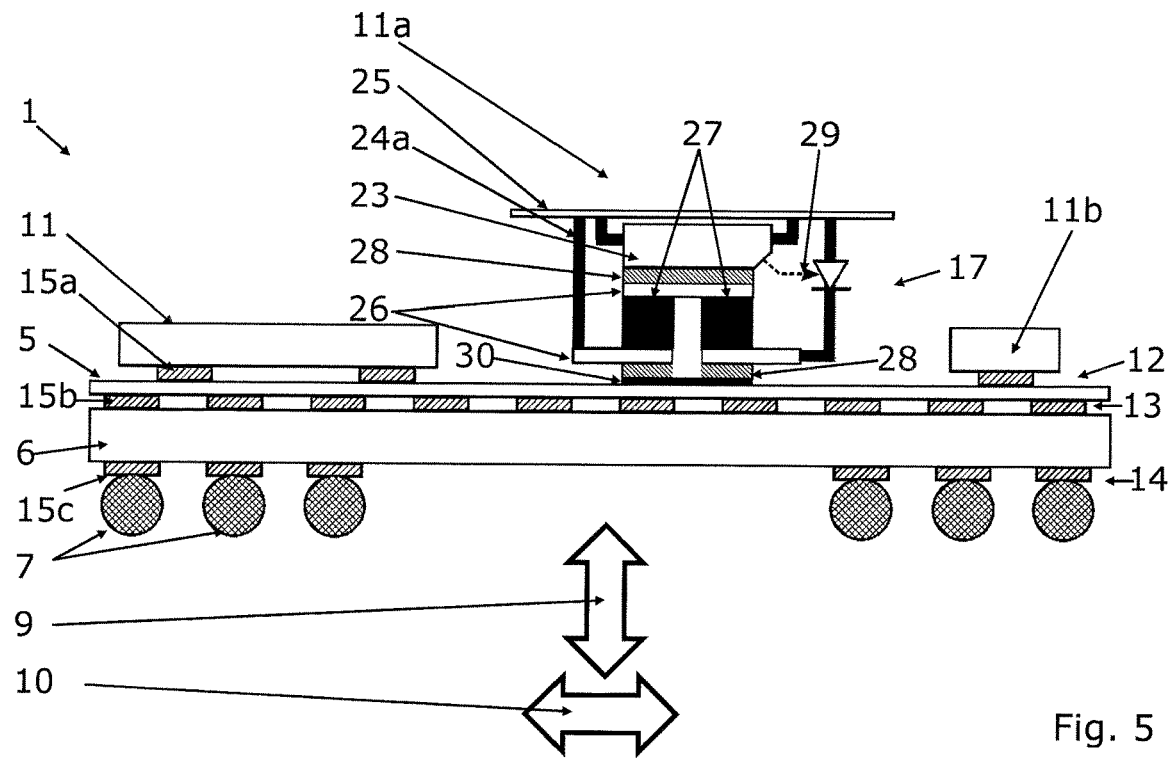
FIG. 5 shows a fifth example embodiment of an induction charging device according to the invention, with a thermoelectric heat pump.

As a difference to FIG. 2, FIG. 5 shows that the first heat conductance device 12 has at least one heat-conducting element 17 with a thermoelectric heat pump. The power electronics unit 11a is formed, by way of example, partially by a circuit board 25, which forms via electrical contacts 24 an electrical power supply of an electronics component 23. The electronics component 23 has, for example, a high heat flux density, which can be actively dissipated via the heat-conducting element 17.

The heat-conducting element 17 has, by way of example, two thermoelectric elements 27, which are connected with one another in an electrically conducting manner via connector bridges 26. The conductor bridges 26 are connected with the circuit board 25 via electrical contacts 24a, wherein the electrical power supply of the heat-conducting element 17 can be controlled and/or regulated via a switching element 29 through the power electronics unit 11a, in particular the electronic component 23.

The conductor bridges 26 are connected in a materially bonded manner via metallized ceramic substrates 28 and/or a materially bonded connection 30, on the electronics component 23 or respectively on the cooling device 5. The materially bonded connection 30 can be formed for example by soldering. The metallization can serve for the ceramic substrate to be able to be better connected, e.g. so that a soldering process is facilitated and/or improved.

Figure 6:
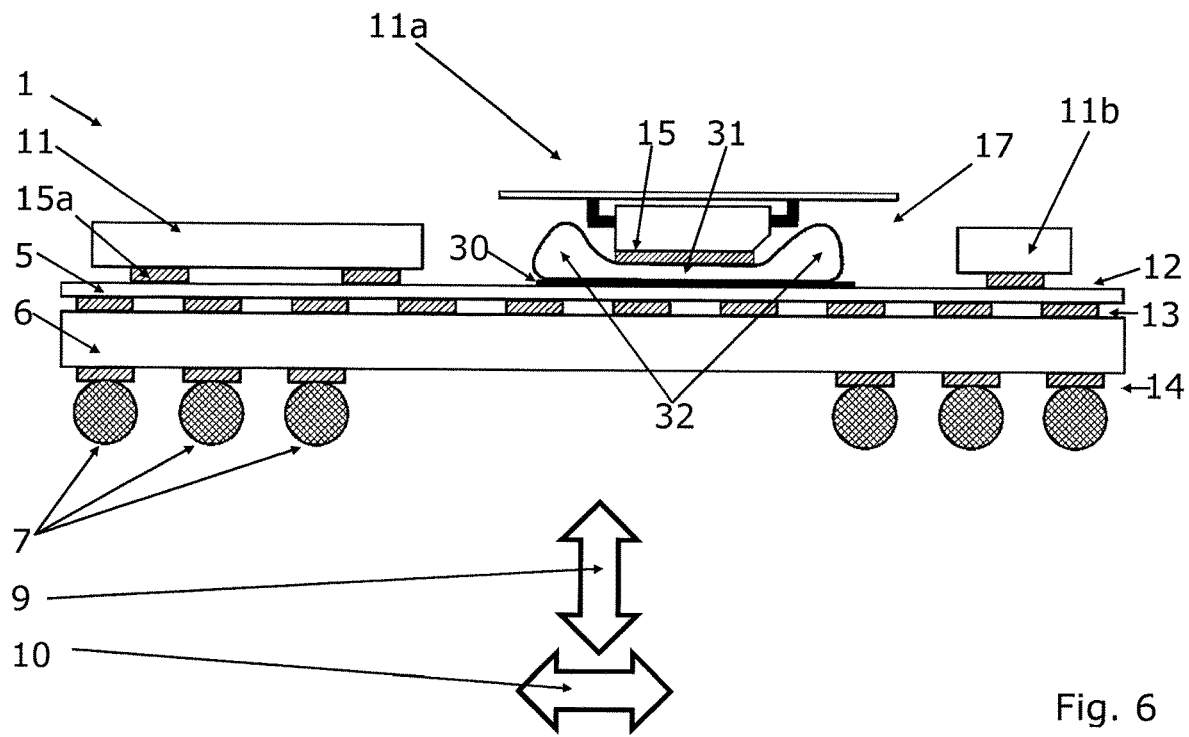
FIG. 6 shows a sixth example embodiment of an induction charging device according to the invention, with a heat pump.

As a difference to FIG. 2, FIG. 6 shows that the heat conductance device 12 on the electronics side has at least one heat-conducting element 17, which forms a heat pump which forms a transport of heat through a phase transition of a refrigerant or coolant encapsulated in the heat pump. For this, the heat pump has an evaporation chamber 31 or respectively an evaporation zone, which is formed with respect to the lateral axis 10 between two condensation chambers 32 or respectively condensation zones formed by the heat pump. As this heat pump has a greater lateral extent than, for example, the electronics component, hereby also a reduction of the heat flux density is enabled, in which an integrally formed heat spreader is provided. The heat pump can be connected to the electronics component 23 via a heat-conducting element 15. The heat pump can be connected to the cooling device 5 for example in a materially bonded manner, in particular by soldering. The materially bonded connection 30 can be formed, for example, by soldering.

Figure 7:
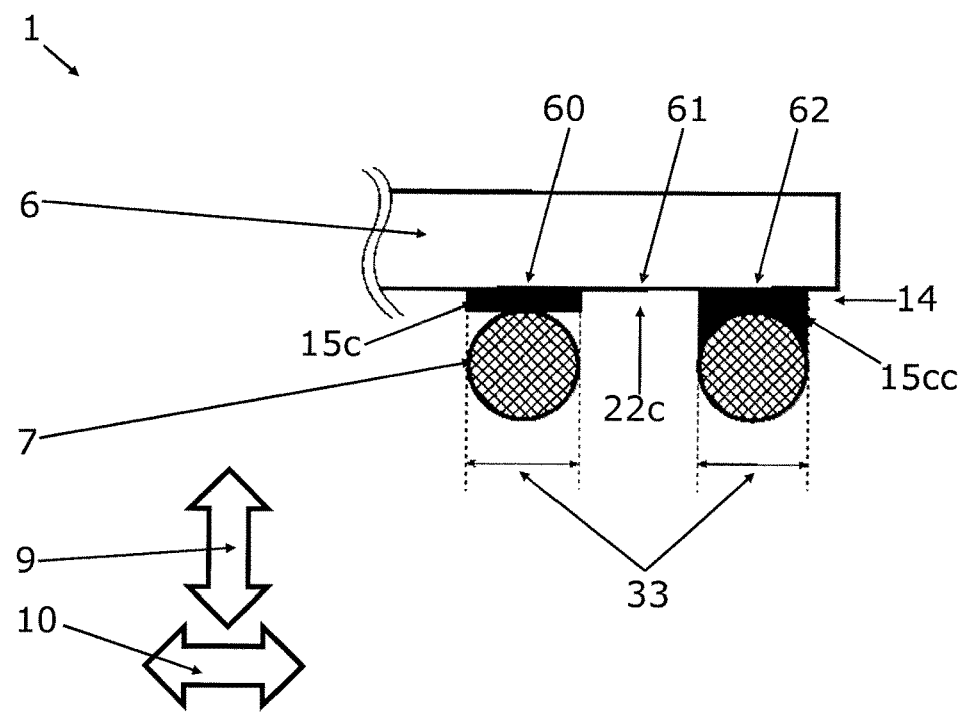
FIG. 7 shows an enlarged detail of the region between induction coil and magnetic field conductor unit.

FIG. 7 shows an enlarged part detail of the heat conductance device 14 on the coil side. At regions 61 of the magnetic field conductor unit 6, at which with respect to the axial axis 9 no induction coil 7, in particular no litz wire of the induction coil 7, is arranged, thermal insulating regions 22c are formed. The insulating regions 22c can be air regions.

At regions 60 and 62 of the magnetic field conductor unit 6, at which with respect to the axial axis 9 the induction coil 7, in particular a litz wire of the induction coil 7, is arranged, heat-conducting regions 15c or respectively 15cc and/or heat-conducting elements 15c or respectively 15cc can be formed, which are illustrated here having a black area.

The heat conductance device 14 on the coil side can partially (see 15c) or completely (see 15cc) fill by heat-conducting regions and/or heat-conducting elements the space which is formed between the induction coil 7 and the magnetic field conductor unit 6 with respect to the axial axis. Such a filling by heat-conducting regions and/or heat-conducting elements can have an extent with respect to the lateral axis 10 which partially or completely corresponds to a litz wire diameter 33.

In an embodiment which is not illustrated, the space which is formed between the induction coil 7 and the magnetic field conductor unit 6 with respect to the axial axis can be filled exclusively partially (see 15c) by heat-conducting regions and/or heat-conducting elements of the heat conductance device 14 on the coil side. In a further embodiment which is not illustrated, the space which is formed between the induction coil 7 and the magnetic field conductor unit 6 with respect to the axial axis, can be filled exclusively completely (see 15cc) by heat-conducting regions and/or heat-conducting elements of the heat-conducting device 14 on the coil side. A partial combination of these two embodiments is also conceivable, as is illustrated by way of example in FIG. 7. Here, the space which is formed between the induction coil 7 and the magnetic field conductor unit 6 with respect to the axial axis is filled partially in part (see 15c) and partially completely (see 15cc) by heat-conducting regions and/or heat-conducting elements of the heat conductance device 14 on the coil side.

FIG. 8 shows a vehicle charging system 2 according to the invention, with a stationary induction charging station 18 which is formed at least partially by an induction charging device 1, and a vehicle 19, which has an on-board induction charging device 20, which is formed at least partially by an induction charging device 1. The vehicle charging system 2 is formed for the wireless energy transfer from the stationary induction charging station 18 to the on-board induction charging device 20 of the vehicle 19.

Figure 9:
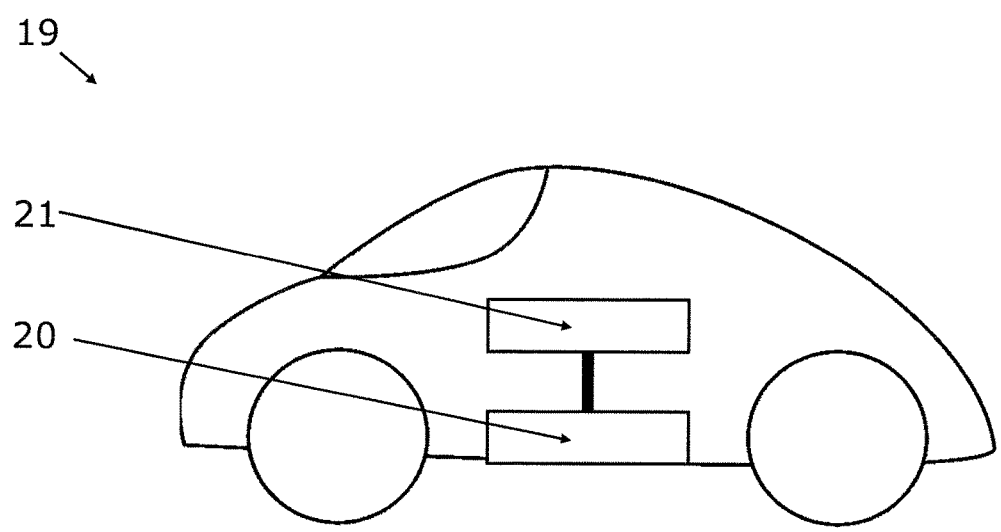
FIG. 9 shows a vehicle for a vehicle charging system according to FIG. 8.

FIG. 9 shows a vehicle 19 for a vehicle charging system. The vehicle 19 has an on-board induction charging device 20, which is formed at least partially by an induction charging device 1. Furthermore, the vehicle 19 has a traction battery unit 21, which is coupled electrically with the on-board induction charging device 20, wherein the on-board induction charging device 20 is formed for the supplying of the traction battery unit 21 with electrical energy.

The invention claimed is:

1. An induction charging device for a vehicle charging system, comprising:
   a housing defining a housing interior;
   a cooling device, arranged in the housing interior, for cooling the induction charging device;
   a magnetic field conductor unit arranged in the housing interior and configured to direct a magnetic field;
   at least one induction coil arranged in the housing interior and configured to wirelessly transfer energy with a predetermined transmission power;
   at least one heat conductance device arranged in the housing interior and configured to transport heat between at least two components arranged within the housing interior;
   the at least one heat conductance device arranged, with respect to an axial axis, between the at least two components;

wherein the at least one heat conductance device has an axial thermal conductivity with respect to the axial axis; and wherein the axial thermal conductivity of the at least one heat conductance device varies at least partially with respect to at least one lateral axis that is aligned at least one of substantially perpendicularly and substantially transversely to the axial axis.

2. The induction charging device according to claim 1, further comprising at least one power electronics unit arranged in the housing interior.

3. The induction charging device according to claim 2, wherein:

the at least one power electronics unit and the cooling device are arranged spaced apart from one another with respect to the axial axis;

the at least one heat conductance device includes a heat conductance device on an electronics side, the heat conductance device, with respect to the axial axis, arranged between the at least one power electronics unit and the cooling device; and the heat conductance device is arranged at least partially on the power electronics unit and on the cooling device.

4. The induction charging device according to claim 1, wherein:

the cooling device and the magnetic field conductor unit are arranged spaced apart from one another with respect to the axial axis;

the at least one heat conductance device includes a heat conductance device on a magnetic field conductor side, the heat conductance device, with respect to the axial axis, arranged between the cooling device and the magnetic field conductor unit; and the heat conductance device is arranged at least partially on the cooling device and on the magnetic field conductor unit.

5. The induction charging device according to claim 1, wherein:

the magnetic field conductor unit and the at least one induction coil are arranged spaced apart from one another with respect to the axial axis;

the at least one heat conductance device includes a heat conductance device on a coil side, the heat conductance device, with respect to the axial axis, arranged between the magnetic field conductor unit and the at least one induction coil; and the heat conductance device is arranged at least partially on the magnetic field conductor unit and on the at least one induction coil.

6. The induction charging device according to claim 5, wherein at least one:

the heat conductance device is formed at least one of continuously and at least partially according to a winding path of the at least one induction coil; and the heat conductance device is structured such that each coil section of the at least one induction coil, which is disposed opposite the magnetic field conductor unit with respect to the axial axis, is connected in a thermally contacting manner with the magnetic field conductor unit via at least one section of the heat conductance device.

7. The induction charging device according to claim 1, wherein the axial thermal conductivity of the at least one heat conductance device includes at least one of a linear variation, a non-linear variation, a stepped variation, and a discontinuous variations along the at least one lateral axis.

8. The induction charging device according to claim 1, wherein:

the at least one heat conductance device includes a plurality of heat-conducting elements; and at least two heat-conducting elements of the plurality of heat-conducting elements are arranged spaced apart from one another with respect to the at least one lateral axis.

9. The induction charging device according to claim 1, wherein the at least one heat conductance device includes at least one of:

at least one heat-conducting element with an anisotropic thermal conductivity; and at least one heat-conducting element with a lateral thermal conductivity with respect to the at least one lateral axis that is greater than the axial thermal conductivity of the at least one heat-conducting element.

10. The induction charging device according to claim 1, wherein the at least one heat conductance device includes at least one of:

at least one heat-conducting element with a heat pump;

at least one heat-conducting element with a thermoelectric heat pump; and at least one heat-conducting element with a heat pump encapsulating at least one of a refrigerant and a coolant, and configured to transport heat via a phase transition of the at least one of the refrigerant and the coolant.

11. The induction charging device according to claim 1, wherein the at least one heat conductance device has a variation of the axial thermal conductivity configured such that the at least two components form a substantially homogeneous temperature distribution.

12. The induction charging device according to claim 1, wherein the at least one heat conductance device includes at least one of:

at least one heat-conducting element disposed at regions which have, at least temporarily, a heat flux density of at least 5 W/cm$^2$;

at least one heat-conducting element with an anisotropic thermal conductivity disposed at regions which have, at least temporarily, a heat flux density of at least 5 W/cm$^2$; and at least one heat-conducting element with a heat pump disposed at regions which, at least temporarily, have a heat flux density of at least 15 W/cm$^2$.

13. The induction charging device according to claim 1, wherein the at least one heat conductance device is self-adhesive.

14. The induction charging device according to claim 1, wherein the at least one heat conductance device is composed of an electrically insulating heat-conducting material.

15. The induction charging device according to claim 1, wherein at least one of:

the housing is composed of a casting compounds; and the housing interior is at least partially filled with a casting compound.

16. A vehicle charging system, comprising:

an induction charging device according to claim 1;

wherein the induction charging device is structured as a portion of at least one of a stationary induction charging station and an on-board induction charging device of a vehicle; and wherein the vehicle charging system is configured to facilitate wireless energy transfer from the stationary induction charging station to the on-board induction charging device of the vehicle.

17. A vehicle for a vehicle charging system, comprising:
an on-board induction charging device including an induction charging device;
a traction battery unit coupled electrically with the on-board induction charging device;
the induction charging device including:
  a housing defining a housing interior;
  a cooling device, arranged in the housing interior, for cooling the induction charging device;
  a magnetic field conductor unit arranged in the housing interior and configured to direct a magnetic field;
  at least one induction coil arranged in the housing interior and configured to wirelessly transfer energy with a predetermined transmission power; and
  at least one heat conductance device arranged in the housing interior and configured to transport heat between at least two components arranged within the housing interior;
the at least one heat conductance device arranged, with respect to an axial axis, between the at least two components;
the at least one heat conductance device having an axial thermal conductivity with respect to the axial axis;
wherein the axial thermal conductivity of the at least one heat conductance device varies at least partially with respect to at least one lateral axis that is aligned at least one of substantially perpendicularly and substantially transversely to the axial axis; and
wherein the on-board induction charging device is configured to supply the traction battery unit with electrical energy.

18. A stationary induction charging station for a vehicle charging system configured to facilitate wireless energy transfer to an on-board induction charging device of a vehicle, comprising an induction charging device including:
  a housing defining a housing interior;
  a cooling device, arranged in the housing interior, for cooling the induction charging device;
  a magnetic field conductor unit arranged in the housing interior and configured to direct a magnetic field;
  at least one induction coil arranged in the housing interior and configured to wirelessly transfer energy with a predetermined transmission power; and
  at least one heat conductance device arranged in the housing interior and configured to transport heat between at least two components arranged within the housing interior;
the at least one heat conductance device arranged, with respect to an axial axis, between the at least two components;
the at least one heat conductance device having an axial thermal conductivity with respect to the axial axis; and
wherein the axial thermal conductivity of the at least one heat conductance device varies at least partially with respect to at least one lateral axis that is aligned at least one of substantially perpendicularly and substantially transversely to the axial axis.

19. The induction charging device according to claim 1, wherein the cooling device is configured as a cooling body through which a fluid is flowable.

20. The induction charging device according to claim 1, wherein:
  the at least two components includes a power electronics unit, the magnetic field conductor unit, the cooling device, and the at least one induction coil;
  the at least one heat conductance device includes a plurality of heat conductance devices;
  a first heat conductance device of the plurality of heat conductance devices is arranged between and in contact with the at least one power electronics unit and the cooling device;
  a second heat conductance device of the plurality of heat conductance devices is arranged between and in contact with the magnetic field conductor unit and the cooling device; and
  a third heat conductance device of the plurality of heat conductance devices is arranged between and in contact with the magnetic field conductor unit and the at least one induction coil.

\* \* \* \* \*